(12) United States Patent
Hosen

(10) Patent No.: US 10,527,088 B2
(45) Date of Patent: Jan. 7, 2020

(54) DUST COVER

(71) Applicant: NOK CORPORATION, Tokyo (JP)

(72) Inventor: Tatsuro Hosen, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 343 days.

(21) Appl. No.: 15/505,094

(22) PCT Filed: Jul. 13, 2015

(86) PCT No.: PCT/JP2015/070021
§ 371 (c)(1),
(2) Date: Feb. 19, 2017

(87) PCT Pub. No.: WO2016/027590
PCT Pub. Date: Feb. 25, 2016

(65) Prior Publication Data
US 2019/0154078 A1 May 23, 2019

(30) Foreign Application Priority Data

Aug. 21, 2014 (JP) .................................. 2014-168294

(51) Int. Cl.
*F16C 11/06* (2006.01)
*F16J 15/52* (2006.01)
*F16J 15/12* (2006.01)

(52) U.S. Cl.
CPC ...... *F16C 11/0671* (2013.01); *F16C 11/0642* (2013.01); *F16C 11/0685* (2013.01);
(Continued)

(58) Field of Classification Search
CPC ............. F16C 11/0671; F16C 11/0642; F16C 11/0685; F16C 2326/01; F16J 15/12; F16J 15/52; F16J 15/36
See application file for complete search history.

(56) References Cited

U.S. PATENT DOCUMENTS

2007/0231060 A1    10/2007 Abels
2010/0025950 A1    2/2010 Budde et al.
(Continued)

FOREIGN PATENT DOCUMENTS

EP    1010905 A1 * 6/2000 .......... F16C 11/0671
EP    2012028 B1    8/2012
(Continued)

OTHER PUBLICATIONS

Extended European Search Report dated Apr. 6, 2018 (corresponding to EP15832994.6).

*Primary Examiner* — Gilbert Y Lee
(74) *Attorney, Agent, or Firm* — Harness, Dickey & Pierce, P.L.C.

(57) ABSTRACT

A dust cover that enables a dust lip to consistently exhibit its sealing function. The dust cover includes a sealing body made of an elastic material and integrally including a body part 110, a fixed part, and a sealed part 120, and a reinforcing ring 150 made of metal or resin and embedded in the sealed part 120. The sealed part 120 includes a first inner circumferential sealed portion 121a, a second inner circumferential sealed portion 121b, and a dust lip 122 slidable against an end face of a knuckle 400. The reinforcing ring 150 includes a tubular part 151 concentric to a shaft part 310, an inward flange part 152 provided at one end of the tubular part 151 and supported on a flange 330 fixed to the shaft part 310, and a pressing part 154 provided at the other end of the tubular part 151 and pressing the dust lip 122 against the end face of the knuckle 400.

2 Claims, 6 Drawing Sheets

(52) U.S. Cl.
CPC .............. *F16J 15/12* (2013.01); *F16J 15/52* (2013.01); *F16C 2326/01* (2013.01)

(56) References Cited

U.S. PATENT DOCUMENTS

| | | | |
|---|---|---|---|
| 2011/0020056 A1 | 1/2011 | Bernhardt et al. | |
| 2016/0273578 A1* | 9/2016 | Yanagi | F16J 3/04 |
| 2017/0234361 A1* | 8/2017 | Hosen | F16J 3/04 |
| | | | 403/134 |
| 2018/0149192 A1* | 5/2018 | Hosen | F16J 3/04 |

FOREIGN PATENT DOCUMENTS

| | | | | |
|---|---|---|---|---|
| JP | H04032313 U | 3/1992 | | |
| JP | 2008-524531 A | 7/2008 | | |
| JP | 2009-014064 A | 1/2009 | | |
| JP | 2011-099533 A | 5/2011 | | |
| JP | 2013-181630 A | 9/2013 | | |
| WO | WO-2014020980 A1 * | 2/2014 | .......... | F16C 11/0671 |
| WO | WO-2015186441 A1 * | 12/2015 | .............. | F16J 3/042 |

\* cited by examiner

DUST COVER

CROSS-REFERENCE TO RELATED APPLICATIONS

This application is a National Stage of International Application No. PCT/JP2015/070021, filed Jul. 13, 2015 now WO/2016/027590 which claims priority to Japanese Application No. 2014-168294, filed Aug. 21, 2014. The entire disclosures of each of the above applications are incorporated herein by reference.

FIELD

The present disclosure relates to a dust cover used for a ball joint equipped in various apparatuses such as vehicles.

BACKGROUND

In ball joints equipped in various apparatuses such as vehicles, a dust cover is used for preventing entrance of water, dust or the like into the joint part and for preventing escape of grease from the joint part. A dust cover used in a ball joint according to a prior art example will be described with reference to FIG. 6. FIG. 6 is a schematic cross-sectional view of the ball joint and the dust cover mounted in the ball joint according to the prior art example.

The ball joint includes a ball stud 300 that has a spherical part at one end of a shaft part thereof, a socket 200 that supports the ball stud 300 rotatably and swingably, and a knuckle 400 provided on the opposite side of the shaft part from the spherical part. The dust cover 700 includes a sealing body made of an elastic material and integrally having a film-like deformable body part 710, a fixed part 730 provided at one end of the body part 710 to be fixed to the socket 200, and a sealed part 720 provided at the other end of the body part 710. The sealed part 720 includes an inner circumferential sealed portion 721 that is slidable against the shaft part of the ball stud 300, and a dust lip 722 that is slidable against the knuckle 400. A reinforcing ring 750 made of metal or resin is embedded in the sealed part 720.

The reinforcing ring 750 includes a tubular part that is concentric to the shaft part of the ball stud 300. The inner circumferential sealed portion 721 is pressed radially inward by this tubular part. This way, the sealing function provided by the inner circumferential sealed portion 721 is consistently exhibited. However, with the dust cover 700 according to the prior art example, the sealing function of the dust lip 722 is dependent on the deformed state of the body part 710, because of which the sealing performance is not consistently achieved. Namely, when the ball stud 300 is inclined to the left in the drawing as shown in FIG. 6, for example, the portion of the body part 710 on the left side of the drawing is compressed, while the portion on the right side of the drawing is stretched. Therefore, while the portion of the dust lip 722 on the left side of the drawing is pressed against the knuckle 400 and can therefore fully provide the sealing function, the portion on the right side of the drawing is subjected to a force that causes the lip to move away from the knuckle 400, because of which the sealing function is compromised. The sealing function provided by the dust lip 722 is not necessarily consistent in this way.

CITATION LIST

Patent Literature

[PTL 1] Japanese Patent Application Laid-open No. 2009-14064
[PTL 2] Japanese Patent Application Laid-open No. 2013-181630

SUMMARY

Technical Problem

An object of the present disclosure is to provide a dust cover capable of consistently exhibiting the sealing function provided by a dust lip.

Solution to Problem

The present disclosure adopted the following means to achieve the object noted above.

Namely, the dust cover of the present disclosure is a dust cover used for a ball joint that includes a ball stud having a spherical part at one end of a shaft part thereof, a socket having a bearing for the spherical part and supporting the ball stud rotatably and swingably, and an annular member provided on an opposite side of the shaft part from the spherical part. The dust cover includes: a sealing body made of an elastic material and integrally including a deformable body part, a fixed part provided at one end of the body part and fixed to the socket, and a sealed part provided at the other end of the body part and being slidable against each of the shaft part and the annular member; and a reinforcing ring made of metal or resin and embedded in the sealed part.

The sealed part includes an inner circumferential sealed portion slidable against an outer circumferential surface of the shaft part (including an outer circumferential surface of the shaft part itself of the ball stud, and an outer circumferential surface of another component fixed to the shaft part in the present disclosure), and a dust lip slidable against an end face of the annular member.

The reinforcing ring includes a tubular part concentric to the shaft part, an inward flange part provided at one end of the tubular part and supported on a fixed member fixed to the shaft part (including a fixed member integrally provided to the shaft part), and a pressing part provided at the other end of the tubular part and pressing the dust lip against the end face of the annular member.

The reinforcing ring according to the present disclosure has an inward flange part provided at one end of the tubular part thereof and supported on a fixed member fixed to the shaft part of the ball stud. The disclosure adopts a configuration wherein, in this state, the pressing part provided at the other end of the tubular part presses the dust lip against the end face of the annular member that is fixed to the shaft part of the ball stud. Therefore, the dust lip is consistently pressed against the end face of the annular member that is fixed to the shaft part of the ball stud without being affected by the orientation of the ball stud relative to the socket. Accordingly, the dust lip can consistently exhibit its sealing function.

Preferably, the pressing part is formed by an inclined portion inclined radially outward and toward the end face of the annular member, and, when the sealed part is mounted to the shaft part, a tip portion of the pressing part is deformed to move away from the end face of the annular member, whereby the pressing part presses the dust lip against the end face of the annular member with elastic repulsive force thereof.

The inner circumferential sealed portion may preferably be pressed radially inward by the tubular part of the reinforcing ring.

This way, the reinforcing ring achieves the function of pressing the dust lip, and the function of pressing the inner circumferential sealed portion.

Various configurations described above can be adopted in any possible combinations.

Advantageous Effects of the Disclosure

As described above, according to the present disclosure, the sealing function provided by the dust lip can be consistently exhibited.

DRAWINGS

DETAILED DESCRIPTION

Modes for carrying out this disclosure will be hereinafter illustratively described in detail based on specific embodiments with reference to the drawings. It should be noted that, unless otherwise particularly specified, the sizes, materials, shapes, and relative arrangement or the like of constituent components described in the embodiments are not intended to limit the scope of this disclosure to these specifics.

Embodiments

Figure 1:
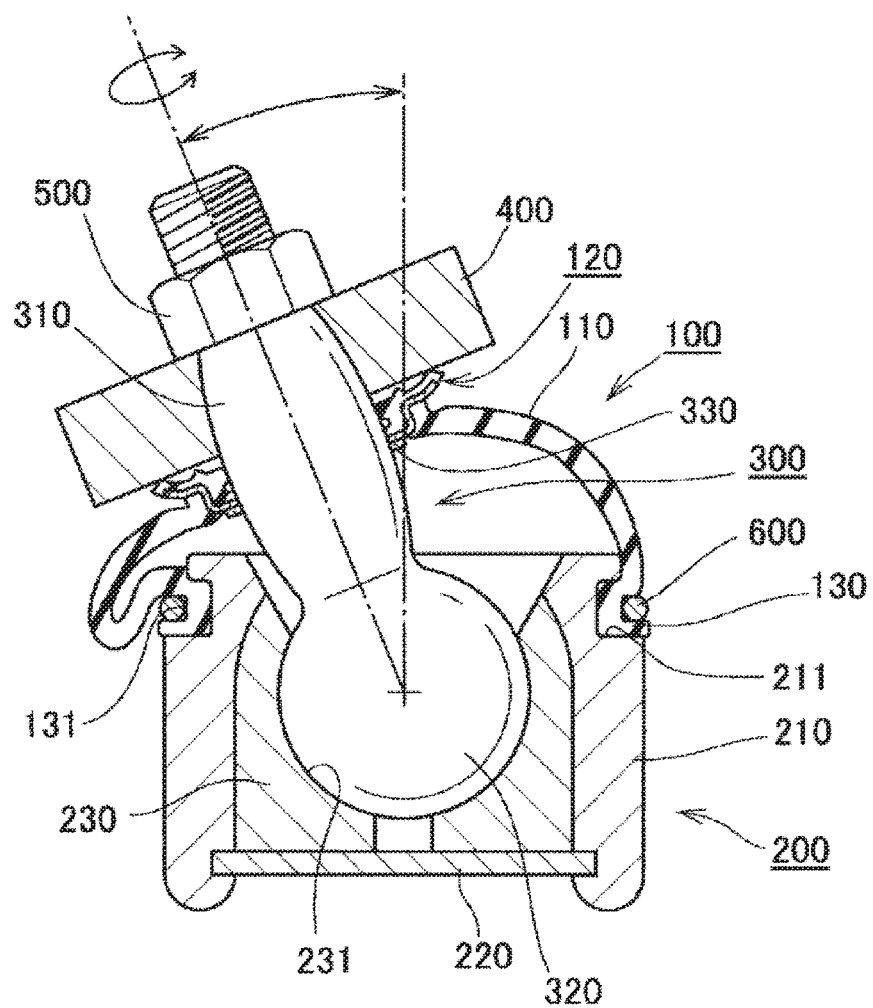
FIG. 1 is a schematic cross-sectional view of a ball joint and a dust cover mounted in the ball joint according to an embodiment of the present disclosure.
Figure 2:
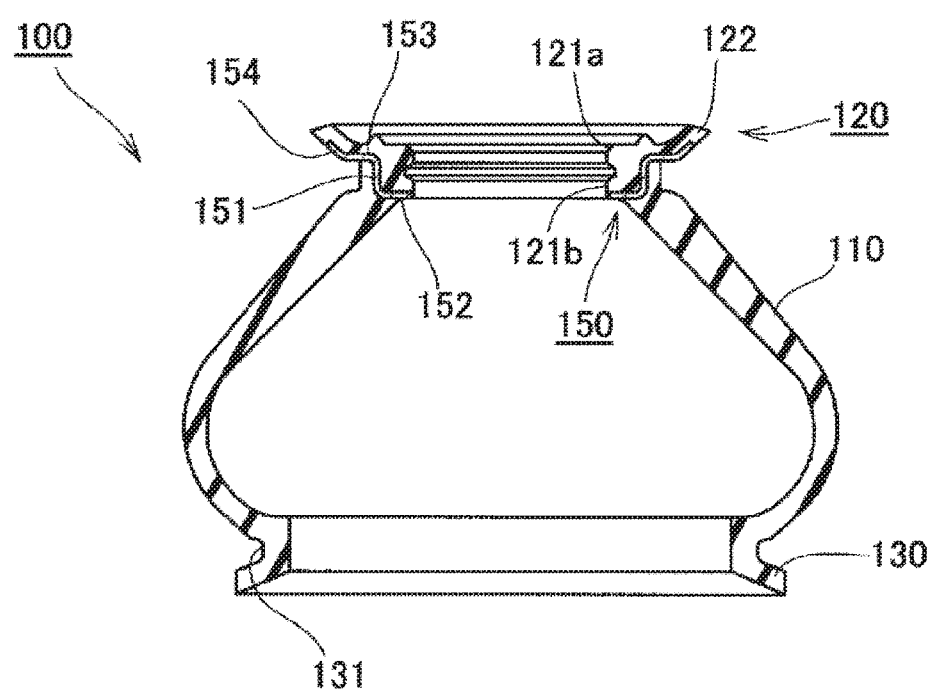
FIG. 2 is a schematic cross-sectional view of the dust cover according to the embodiment of the present disclosure.
Figure 3:
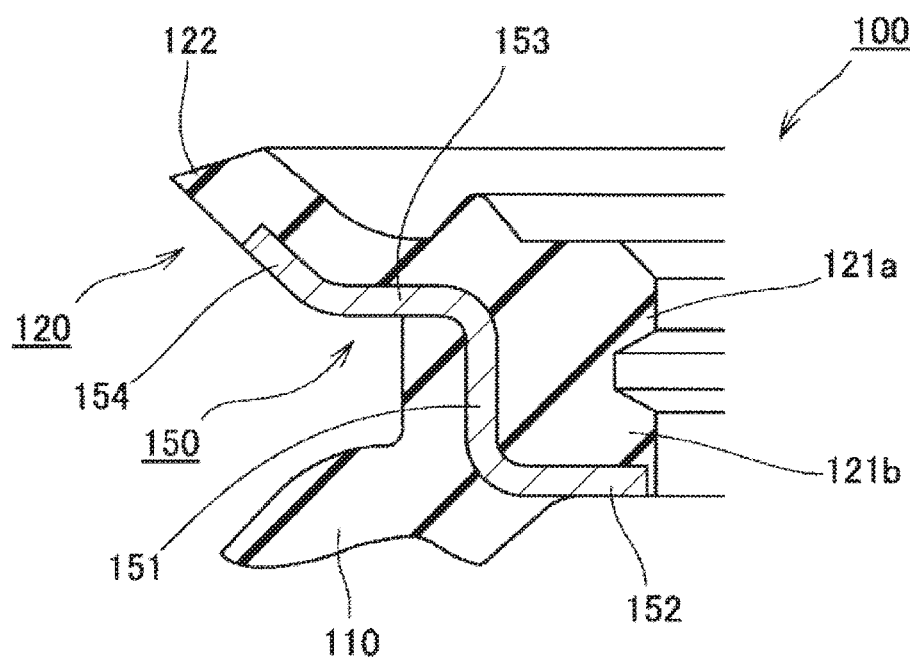
FIG. 3 is an enlarged schematic cross-sectional view illustrating a sealed part and the surroundings thereof in the dust cover according to the embodiment of the present disclosure.
Figure 4:
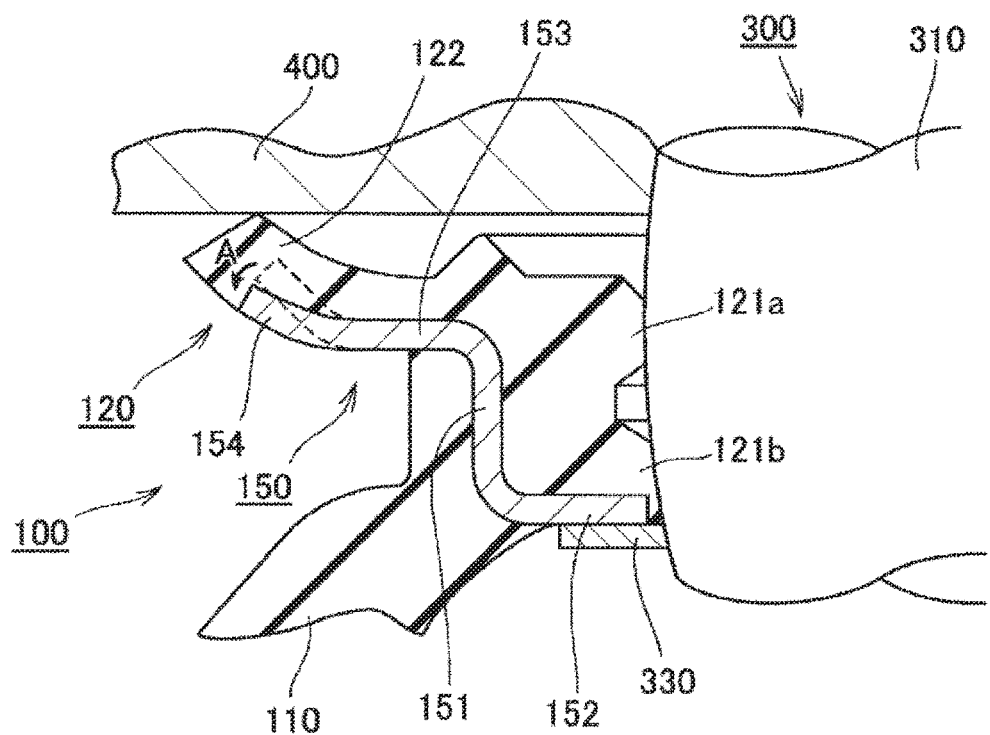
FIG. 4 is an enlarged schematic cross-sectional view illustrating the sealed part and the surroundings thereof in the dust cover according to the embodiment of the present disclosure in a state wherein the dust cover is mounted to the ball joint.
Figure 5:
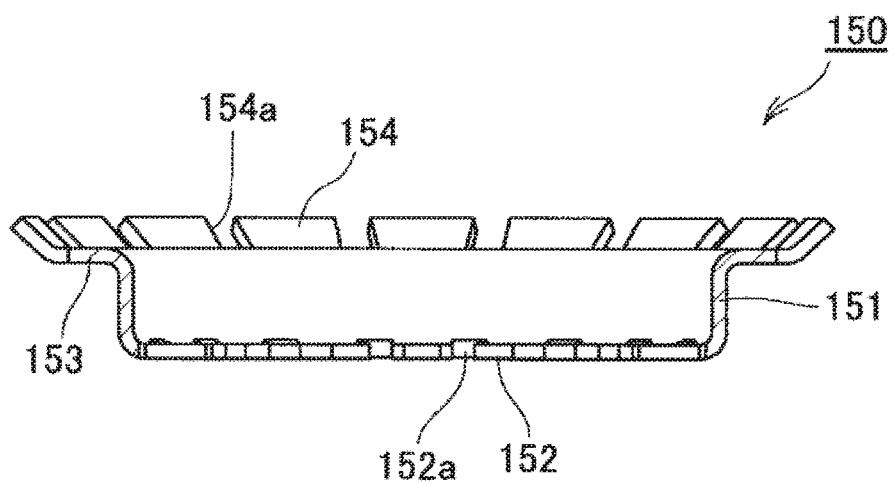
FIG. 5 is a schematic cross-sectional view of a reinforcing ring according to the embodiment of the present disclosure.
Figure 6:
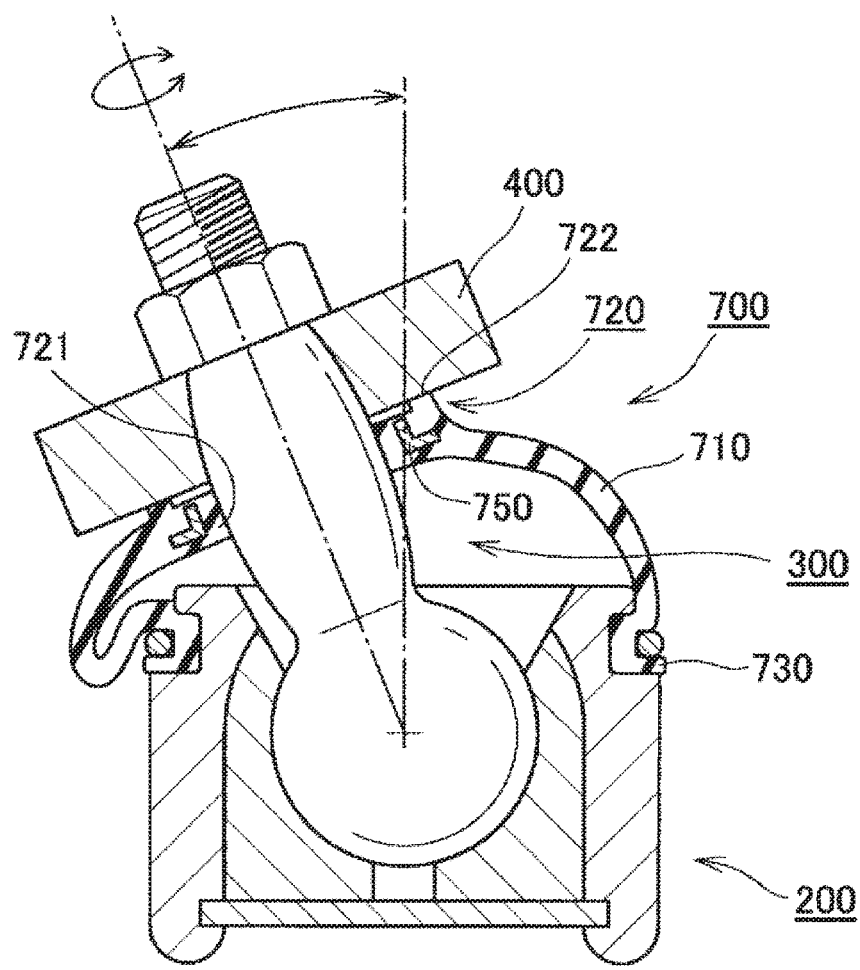
FIG. 6 is a schematic cross-sectional view of a ball joint and a dust cover mounted in the ball joint according to a prior art example.

The dust cover according to an embodiment of the present disclosure will be described with reference to FIG. 1 to FIG. 5. FIG. 1 is a schematic cross-sectional view of a ball joint and a dust cover mounted in the ball joint according to the embodiment of the present disclosure. FIG. 1 shows a cross section cut along a plane that contains the center axis of a shaft part of a ball stud provided in the ball joint. FIG. 2 is a schematic cross-sectional view of the dust cover according to the embodiment of the present disclosure. FIG. 2 shows a cross section cut along a plane that contains the center axis of the annular dust cover in a state where the dust cover is not deformed. FIG. 3 is an enlarged view of part of FIG. 2 showing a schematic cross-sectional view illustrating a sealed part and the surroundings thereof in the dust cover according to the embodiment of the present disclosure. FIG. 4 is an enlarged view of part of FIG. 1 showing a schematic cross-sectional view illustrating the sealed part and the surroundings thereof in the dust cover according to the embodiment of the present disclosure in a state where the dust cover is mounted to the ball joint. FIG. 5 is a schematic cross-sectional view of a reinforcing ring according to the embodiment of the present disclosure. FIG. 5 shows a cross section cut along a plane that contains the center axis of the annular reinforcing ring.

<Ball Joint>

Referring to FIG. 1 in particular, one example of a ball joint to which the dust cover according to the embodiment can be applied will be described. The ball joint includes a ball stud 300 that has a spherical part 320 at one end of a shaft part 310, a socket 200 that supports the ball stud 300 rotatably and swingably, and a knuckle 400 that is an annular member provided on the opposite side of the shaft part 310 from the spherical part 320. The knuckle 400 is provided to a vehicle body or the like. The socket 200 includes an annular case 210, a bottom plate 220 secured to the bottom side of the case 210, and a bearing 230 for the spherical part 320. The bearing 230 has a bearing surface 231 that is a spherical surface having the same radius as the radius of curvature of the spherical part 320. The ball stud 300 is fastened to the knuckle 400 with a nut 500.

A dust cover 100 is used for preventing entrance of water, dust or the like into the joint part and for preventing escape of grease from the joint part.

<Dust Cover>

The entire configuration of the dust cover 100 will be described with reference to FIG. 2 in particular. The dust cover 100 includes a sealing body made of an elastic material such as rubber, and a reinforcing ring 150 made of metal or resin. The sealing body may be formed by insert molding, with the reinforcing ring 150 as the insert component, to obtain the dust cover 100. The sealing body integrally includes an annular, film-like, deformable body part 110, a fixed part 130 provided at one end of the body part 110 to be fixed to the socket 200, and a sealed part 120 provided at the other end of the body part 110. An annular recess 131 is formed in the fixed part 130. A clamp 600 is fitted into this annular recess 131 so that the fixed part 130 is secured to the case 210 of the socket 200. The reinforcing ring 150 is embedded in the sealed part 120. The body part 110 of the dust cover 100 configured as described above deforms when the ball stud 300 rocks relative to the socket 200 (see FIG. 1). When the ball stud 300 rotates relative to the socket 200, the sealed part 120 slides against the shaft part 310 of the ball stud 300 and the knuckle 400. This way, the dust cover 100 can exhibit its sealing function even if the ball stud 300 rocks or rotates relative to the socket 200.

<Sealing Part and Reinforcing Ring>

The sealed part 120 and the reinforcing ring 150 according to this embodiment will be described in more detail with reference to FIG. 3 to FIG. 5 in particular. The sealed part 120 includes inner circumferential sealed portions (first inner circumferential sealed portion 121a and second inner circumferential sealed portion 121b) that can slide against an outer circumferential surface of the shaft part 310 of the ball stud 300, and a dust lip 122 that can slide against an end face of the knuckle 400. The first inner circumferential sealed portion 121a and second inner circumferential sealed portion 121b are both formed by annular protrusions projecting radially inwards. While two inner circumferential sealed portions are provided in this embodiment, there may be only one inner circumferential sealed portion, or there may be three or more inner circumferential sealed portions. The dust lip 122 is formed by an inclined portion that is inclined radially outward and toward the end face of the knuckle 400.

The reinforcing ring 150 includes a tubular part 151 concentric to the shaft part 310 of the ball stud 300, an inward flange part 152 provided at one end of the tubular part 151, and an outward flange part 153 provided at the other end of the tubular part 151. The outward flange part 153 is provided with a pressing part 154 that presses the dust lip 122 against the end face of the knuckle 400. A plurality of circumferentially spaced slits 152a are formed in the inward flange part 152 (see FIG. 5). Therefore, the body part 110 and the sealed part 120 of the sealing body are connected to and integral with each other. A plurality of circumferentially spaced slits 154a are also formed in the pressing part 154 (see FIG. 5). This way, the pressure applied by the pressing part 154 is adjusted.

To the shaft part 310 of the ball stud 300 is secured a flange 330 as a fixed member. With the sealed part 120 of the dust cover 100 being attached to the ball stud 300, the inward flange part 152 of the reinforcing ring 150 makes tight contact with this flange 330 so that the inward flange part 152 is supported by the flange 330 (see FIG. 4). The flange 330 is made of a material with high rigidity such as metal or resin. While the flange 330 that is a component separate from the shaft part 310 is fixed to the shaft part 310 in this embodiment, another configuration may be adopted wherein the shaft part 310 integrally includes a portion corresponding to the flange 330.

The pressing part 154 of the reinforcing ring 150 is formed by an inclined portion that is inclined radially outward and toward the end face of the knuckle 400. With the sealed part 120 being attached to the shaft part 310 of the ball stud 300, the tip of this pressing part 154 is deformed to move away from the end face of the knuckle 400 (see arrow A in FIG. 4). This way, the dust lip 122 is pressed against the end face of the knuckle 400 by the elastic repulsive force of the pressing part 154.

A portion of the sealed part 120 located inside the tubular part 151 of the reinforcing ring 150 is compressed between the inner circumferential surface of the tubular part 151 and the outer circumferential surface of the shaft part 310 of the ball stud 300. Therefore, the first inner circumferential sealed portion 121a and second inner circumferential sealed portion 121b are pressed radially inward by the tubular part 151 of the reinforcing ring 150.

<Advantages Provided by the Dust Cover According to the Embodiment>

In the dust cover 100 according to this embodiment, the inward flange part 152 provided at one end of the tubular part 151 of the reinforcing ring 150 is supported on the flange 330 that is fixed to the shaft part 310 of the ball stud 300. The embodiment adopts a configuration wherein, in this state, the pressing part 154 provided at the other end of the tubular part 151 presses the dust lip 122 against the end face of the knuckle 400 that is fixed to the shaft part 310 of the ball stud 300. Therefore, the dust lip 122 is consistently pressed against the end face of the knuckle 400 without being affected by the orientation of the ball stud 300 relative to the socket 200. Namely, when the ball stud 300 rocks relative to the socket 200, while the body part 110 of the dust cover 100 deforms, the sealed part 120 does not, because the reinforcing ring 150 embedded inside the sealed part is supported on the flange 330 that is fixed to the shaft part 310. Accordingly, since the dust lip 122 is not affected by the orientation of the ball stud 300 relative to the socket 200, the dust lip 122 can consistently exhibit its sealing function. For the same reasons, the first inner circumferential sealed portion 121a and second inner circumferential sealed portion 121b can consistently exhibit their sealing functions.

According to this embodiment, as described above, the reinforcing ring 150, which is a single component, achieves the function of pressing the dust lip 122 and the function of pressing the first inner circumferential sealed portion 121a and second inner circumferential sealed portion 121b.

(Others)

In the embodiment described above, one case is shown in which the annular member against which the dust lip 122 slides is the knuckle 400. In the present disclosure, however, the annular member against which the dust lip 122 slides is not limited to the knuckle 400. The disclosure is applicable when the annular member described above is a ferrule, for example, in a configuration wherein a ferrule is provided, which abuts on the knuckle, as in the technique disclosed in Japanese Patent Application Laid-open No. H11-63245. In the embodiment described above, one case is shown in which the first inner circumferential sealed portion 121a and second inner circumferential sealed portion 121b directly slide against the outer circumferential surface of the shaft part 310 of the ball stud 300. However, the present disclosure is also applicable to a configuration in which an inner circumferential sealed portion is slidable against the outer circumferential surface of a different component that is fixed to a shaft part of the ball stud. For example, the present disclosure can be applied to a configuration in which an inner circumferential sealed portion slides against a ferrule as in the technique disclosed in Japanese Patent Application Laid-open No. H11-63245 noted above.

REFERENCE SIGNS LIST

100 Dust cover
110 Body part
120 Sealed part
121a First inner circumferential sealed portion
121b Second inner circumferential sealed portion
122 Dust lip
130 Fixed part
131 Annular recess
150 Reinforcing ring
151 Tubular part
152 Inward flange part
152a Slit
153 Outward flange part
154 Pressing part
154a Slit
200 Socket
210 Case
220 Bottom plate
230 Bearing
231 Bearing surface
300 Ball stud
310 Shaft part
320 Spherical part
330 Flange
400 Knuckle
500 Nut
600 Clamp

The invention claimed is:

1. A dust cover used for a ball joint that includes a ball stud having a spherical part at one end of a shaft part thereof, a socket having a bearing for the spherical part and supporting the ball stud rotatably and swingably, and an annular member provided on an opposite side of the shaft part from the spherical part, the dust cover comprising:
   a sealing body made of an elastic material and integrally including a deformable body part, a fixed part provided at one end of the body part and fixed to the socket, and a sealed part provided at the other end of the body part and being slidable against each of the shaft part and the annular member; and
   a reinforcing ring made of metal or resin and embedded in the sealed part, wherein
   the sealed part includes
   an inner circumferential sealed portion slidable against an outer circumferential surface of the shaft part, and
   a dust lip slidable against an end face of the annular member, and
   the reinforcing ring includes
   a tubular part concentric to the shaft part,
   an inward flange part provided at one end of the tubular part and supported on a fixed member fixed to the shaft part, and
   a pressing part provided at the other end of the tubular part and pressing the dust lip against the end face of the annular member;
   wherein the pressing part is formed by an inclined portion inclined radially outward and toward the end face of the annular member, and wherein, when the sealed part is mounted to the shaft part, a tip portion of the pressing part is deformed to move away from the end face of the annular member, whereby the pressing part presses the dust lip against the end face of the annular member with elastic repulsive force thereof.

2. The dust cover according to claim 1, wherein the inner circumferential sealed portion is pressed radially inward by the tubular part of the reinforcing ring.

* * * * *